US012073766B1

(12) United States Patent
Fan et al.

(10) Patent No.: US 12,073,766 B1
(45) Date of Patent: Aug. 27, 2024

(54) DISPLAY DEVICE AND DRIVING METHOD THEREOF BY REDUCING TOTAL QUANTITIES OF DRIVEN DATA LINES AND/OR SCAN LINES TO REALIZE DISPLAY OF IMAGES WITH A 7HIGH REFRESH RATE

(71) Applicant: HKC CORPORATION LIMITED, Shenzhen (CN)

(72) Inventors: Tao Fan, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/216,622

(22) Filed: Jun. 30, 2023

(30) Foreign Application Priority Data

Mar. 21, 2023 (CN) ......................... 202310276302.0

(51) Int. Cl.
*G09G 3/30* (2006.01)
*G09G 3/20* (2006.01)
*G09G 3/36* (2006.01)

(52) U.S. Cl.
CPC ......... *G09G 3/2096* (2013.01); *G09G 3/2007* (2013.01); *G09G 2320/0242* (2013.01); *G09G 2320/0247* (2013.01); *G09G 2320/0666* (2013.01); *G09G 2340/0435* (2013.01)

(58) Field of Classification Search
CPC ............... G09G 3/2096; G09G 3/2007; G09G 2320/0242; G09G 2320/0247; G09G 2320/0666; G09G 2340/0435
See application file for complete search history.

(56) References Cited

U.S. PATENT DOCUMENTS 2,004,021 A1 11/2004 O'Gorman et al.
10,911,642 B1 * 2/2021 Chen ........................ H04N 5/06
10,923,012 B1 2/2021 Hu et al.
11,205,400 B1 * 12/2021 Jang ..................... G09G 3/2092
2002/0015016 A1 2/2002 Kudo et al.
2008/0180432 A1 * 7/2008 Lee ...................... G09G 3/3611 345/214
2010/0141613 A1 * 6/2010 Sonobe .................... G09G 5/18 345/204
2011/0310296 A1 * 12/2011 Lee ........................ G09G 5/008 348/E5.009

(Continued)

FOREIGN PATENT DOCUMENTS

CN 1551098 A 12/2004
CN 1776799 A 5/2006

(Continued)

*Primary Examiner* — Sanghyuk Park

(57) ABSTRACT

A display device and a driving method thereof are disclosed. The display device includes a display panel and a driving circuit. The driving circuit includes a receiving module and a driving module. The receiving module is used to receive a setting signal for setting a refresh rate of F. The driving module is coupled to the receiving module and is used to drive the data lines and scan lines in the display panel. When $(H\times V\times F)/N>T\mathbf{1}$, the driving module drives the display panel with H' as the total number of rows of the scan lines, and with V as the total number of columns of data lines. The $H'\times V'<H\times V$, and $T\mathbf{1}'=(H'\times V'\times F)/N\leq T\mathbf{1}$. $H\times V$ satisfies $H\times V<T\times N/F$, where $F\geq 48$ hz.

17 Claims, 3 Drawing Sheets

(56) References Cited

U.S. PATENT DOCUMENTS

| | | | | |
|---|---|---|---|---|
| 2015/0332624 | A1* | 11/2015 | Zhang | G09G 3/2096 345/204 |
| 2018/0103231 | A1 | 4/2018 | Ahn et al. | |
| 2022/0343877 | A1* | 10/2022 | Park | G09G 5/12 |

FOREIGN PATENT DOCUMENTS

| | | | |
|---|---|---|---|
| CN | 102609132 | A | 7/2012 |
| CN | 103943075 | A | 7/2014 |
| CN | 107610658 | A | 1/2018 |
| CN | 108922466 | A | 11/2018 |
| CN | 111179874 | A | 5/2020 |
| CN | 113077743 | A | 7/2021 |
| CN | 113506545 | A | 10/2021 |
| JP | 2004341360 | A | 12/2004 |

* cited by examiner

DISPLAY DEVICE AND DRIVING METHOD THEREOF BY REDUCING TOTAL QUANTITIES OF DRIVEN DATA LINES AND/OR SCAN LINES TO REALIZE DISPLAY OF IMAGES WITH A 7HIGH REFRESH RATE

CROSS-REFERENCE TO RELATED APPLICATIONS

This application claims the priority and benefit of Chinese patent application number 2023102763020, entitled "Display Device and Driving Method Thereof" and filed Mar. 21, 2023 with China National Intellectual Property Administration, the entire contents of which are incorporated herein by reference.

TECHNICAL FIELD

The present application relates to the field of display technology, and more particularly relates to a display device and a driving method thereof.

BACKGROUND

The description provided in this section is intended for the mere purpose of providing background information related to the present application but doesn't necessarily constitute prior art.

With the rapid development of display technology and the increasing demands of consumers, the refresh rate of displays is getting higher and higher. At present, the mainstream refresh rates of high-refresh displays are mainly 120 Hz, 144 Hz, 165 Hz, and 240 Hz. However, high-refresh displays have higher requirements for the display driver, and chips corresponding to high refresh rates must be used, and the corresponding production costs will also increase.

Due to the high prices of high-refresh displays, current use scenarios that do not require high refresh rates, such as office and home, still use typical refresh rate (48 HZ and 60 Hz) displays. Therefore, how to increase the refresh rate of the display and realize high-refresh applications without upgrading the hardware is a problem that needs to be solved in the industry.

SUMMARY

In view of the above, it is therefore a purpose of this application to provide a display device and a driving method thereof, which can increase the refresh rate of the display device without upgrading the hardware.

The application discloses a display device. The display device includes a display panel and a driving circuit for driving the display panel. The driving circuit includes a receiving module and a driving module. The receiving module is used to receive a setting signal for setting a refresh rate of F. The driving module is connected to the receiving module and is used to drive the data lines and scan lines in the display panel. When $(H\times V\times F)/N>T1$, the driving module uses H' as the total number of scan lines to drive the display panel, and uses V' as the total number of columns of data lines to drive the display panel, where $H'\times V'<H\times V$, and $T1'=(H'\times V'\times F)/N\leq T1$. $H\times V$ satisfies $H\times V<T\times N/F$, and $F\geq 48$ hz;

H is the total number of scan lines in the display panel, which is equal to the sum of the number of scan lines in the effective region of the display panel and the number of scan lines in the blank region of the display panel. V is the total number of data lines in the display panel, which is equal to the sum of the number of data lines in the effective region of the display panel and the number of data lines in the blank region of the display panel. T1 is the clock frequency of the input signal in the driving circuit, and N is the number of display signal channels.

In some embodiments, when $(H\times V\times F)/N>T1$, the driving module simultaneously reduces the number of scan lines in the blank region and the number of data lines in the blank region.

In some embodiments, when the set refresh rate F changes, the driving module automatically adjusts the number of scan lines in the blank region that are being driven and the number of data lines in the blank region that are being driven.

In some embodiments, when the set refresh rate F becomes smaller, the driving module increases the number of scan lines in the blank region and/or the number of data lines in the blank region that are being driven; where the value of $H\times V\times F$ remains unchanged.

In some embodiments, $1940\leq H'<3000$, $1090\leq V'<2465$.

In some embodiments, the driving circuit includes a connector and a timing control chip. The connector is connected to the timing control chip through a plurality of input signal traces, and provides a low-voltage differential signal for the timing control chip. T1 is the clock frequency of the LVDS. The distance between two adjacent input signal traces is greater than or equal to twice the width of the input signal traces.

In some embodiments, the timing control chip includes a color depth reduction module and a grayscale enhancement module. The color depth reduction module receives the low-voltage differential signal, and reduces the color depth displayed by the low-voltage differential signal. The grayscale enhancement module is connected with the color depth reduction module to provide a sensed grayscale to compensate for the color depth reduced by the color depth reduction module.

In some embodiments, in addition to satisfying $H\times V<T\times N/F$, the $H\times V$ also satisfies $H\times V<T2\times 2N/(F\times M)$; wherein, T2 is the clock frequency of the mini low-voltage differential signal output by the timing control chip, and M is the color depth after processing the mini low-voltage differential signal by the timing control chip.

The application further discloses a display device. The display device includes a display panel and a driving circuit for driving the display panel. The driving circuit includes a timing control chip. The timing control chip receives a low-voltage differential signal and outputs a mini low-voltage differential signal. The driving circuit includes a receiving module and a driving module. The receiving module is used to receive a setting signal for setting a refresh rate of F. The driving module is connected to the receiving module and is used to drive the data lines and scan lines in the display panel. The display panel includes an effective region and a blank region. Both the effective region and the blank region include a plurality of data lines and a plurality of scan lines. F includes 48 HZ, 60 HZ, 75 HZ, 90 HZ or 100 HZ, the number of scan lines in the blank region is 20-1080, and the number of data lines in the blank region is 10-1380.

The present application further discloses a method for driving a display device, which is used to drive the above-mentioned display device, including:

receiving a setting signal for setting the refresh rate;

detecting whether the result of the formula $(H\times V\times F)/N$ is greater than the clock frequency of the input signal; and when the result of the formula (H×V×F)/N is greater than the clock frequency of the input signal, driving all data lines and all scan lines in the display panel; when the result of the formula (H×V×F)/N is less than the clock frequency of the input signal, driving less data lines and/or scan lines in the display panel;

where H is the total number of scan lines in the display panel, which is equal to the sum of the scan lines in the effective region and the scan lines in the blank region; V is the total number of data lines in the display panel, which is equal to the sum of the number of data lines in the effective region and the number of data lines in the blank region; F is the set refresh rate, and N is the number of display signal channels.

Compared with the current solution of improving the refresh rate of the display device by improving the hardware level of the display device, this application does not change the hardware of the display device. When the display device needs to display images with a high refresh rate, if the clock frequency corresponding to the input signal exceeds the receiving range of the driving circuit, the driving module in the display device will reduce the clock frequency of the input signal by reducing the total quantities of the driven data lines and/or the driven scan lines in the display panel, so that the clock frequency of the input signal is within the range that the driving circuit can receive, thereby realizing the display of images with a high refresh rate. Since this process only changes the quantities of the driven data lines and scan lines in the display panel, there is no need to upgrade the chip hardware of the display driver, so it will not increase the cost, so that the low-configuration display driver hardware can achieve the same high refresh rate display effect as the high-configuration display driver hardware, which can reduce the cost of the product and improve the market competitiveness of the product.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
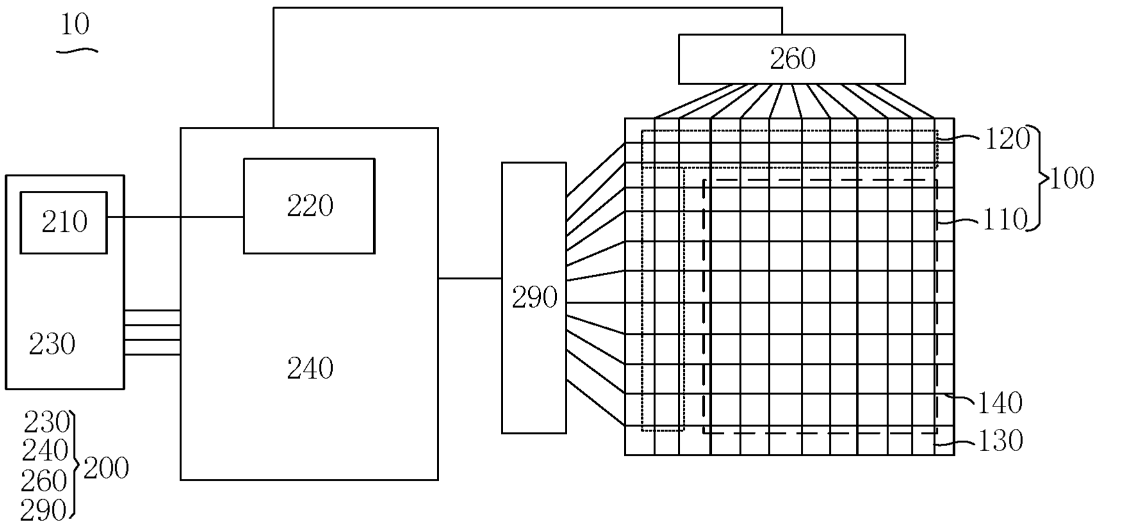
FIG. 1 is a schematic diagram of a display device provided by an embodiment of the present application.

In the drawings: 10, display device; 100, display panel; 110, effective region; 120, blank region; 130, data line, 140, scan line; 200, driving circuit; 210, receiving module; 220, driving module; 230, connector; 231, input signal trace; 240, timing control chip; 241, color depth reduction module; 242, grayscale enhancement module; 243, selection module; 250, gamma module; 260, data driver chip; 270, first register; 280, second register; 290, scan driver chip.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

Hereinafter this application will be described in further detail with reference to the accompanying drawings and some optional embodiments.

As shown in FIG. 1, FIG. 1 is a schematic diagram of a display device provided by an embodiment of the present application. As a display device 10 provided in the embodiments of the present application, the display device 10 includes a display panel 100 and a driving circuit 200 for driving the display panel 100. The driving circuit 200 includes a connector 230, a timing control chip 240, a data driver chip 260 and a scan driver chip 290. The timing control chip 240 includes a signal input interface and a signal output interface. The connector 230 is connected to the signal input interface through an input signal trace, and provides a low-voltage differential signal (LVDS) to the timing control chip 240. The timing control chip 240 provides a mini Low Voltage Differential Signaling (Mini-LVDS) to the data driver chip 260 through the signal output interface. The data driver chip 260 and the scan driver chip 290 are connected to the display panel 100.

The driving circuit 200 further includes a receiving module 210 and a driving module 220. The receiving module 210 is arranged in the connector 230, or is disposed outside the connector 230 and the timing control chip 240 as an independent structure. The driving module 220 is disposed in the timing control chip 240. The receiving module 210 is used to receive a setting signal for setting the refresh rate F. The set refresh rate command is regulated by the user through the display interface or a remote control. The driving module 220 is connected with the receiving module 210 for driving the data lines 130 and the scan lines 140 in the display panel 100.

When (H×V×F)/N>T1, the driving module 220 drives the display panel 100 with H' as the total number of rows of the scan lines 140, and with V as the total number of columns of the data lines 130, wherein H' represents a part of the scan lines 140, and V represents a part of the data lines 130. At this time, H'×V'<H×V, and T1'=(H'×V'×F)/N≤T1; H×V satisfies the formula H×V<T×N/F, and the F≥48 hz. That is, when the refresh rate is too high and the clock frequency exceeds the receiving range of the driving circuit 200, the number of driven scan lines 140 and/or data lines 130 can be reduced to reduce the clock frequency of the received signal in the case of a high refresh rate, so that the clock frequency is within the receiving range of the driving circuit 200.

H is the total number of scan lines 140 in the display panel 100, equal to the sum of the number of scan lines 140 in the effective region 110 in the display panel 100 and the number of scan lines 140 in the blank region 120 in the display panel 100. V is the total number of data lines 130 in the display panel 100, equal to the sum of the number of data lines 130 in the effective region 110 in the display panel 100 and the number of data lines 130 in the blank region 120 in the display panel 100. T1 is the clock frequency of the input signal in the driving circuit 200, and N is the number of the display signal channels. H' is equal to the sum of the number of scan lines 140 in the effective region 110 in the display panel 100 and the number of a part of the scan lines 140 in the blank region 120 of the display panel 100. V' is equal to the sum of the number of data lines 130 in the effective region 110 of the display panel 100 and the number of a part of the data lines 130 in the blank region 120 of the display panel 100.

Compared with the current solution of improving the refresh rate of the display device by improving the hardware level of the display device, this application does not change the hardware of the display device 10. When the display device 10 needs to display images with a high refresh rate, if the clock frequency corresponding to the input signal exceeds the receiving range of the driving circuit 200, the driving module 220 in the display device 10 will reduce the clock frequency of the input signal by reducing the total quantities of the driven data lines 130 and/or the driven scan lines 140 in the display panel 100, so that the clock frequency of the input signal is within the range that the driving circuit 200 can receive, thereby realizing the display of images with a high refresh rate. Since this process only changes the quantities of the driven data lines 130 and driven scan lines 140 in the display panel 100, there is no need to upgrade the chip hardware of the display driver, so it will not increase the cost, so that the low-configuration display driver hardware can achieve the same high refresh rate display effect as the high-configuration display driver hardware, which can reduce the cost of the product and improve the market competitiveness of the product.

By $H' \times V' < H \times V$, it means that of the number of scan lines 140 in the effective region 110, the number of scan lines 140 in the blank region 120, the number of data lines 130 in the effective region 110, and the number of data lines 130 in the blank region 120, only one of these four may be reduced. However, in order not to affect the display effect of the images in the display region and to meet the application of higher refresh rate, in the embodiment of the present application, it is preferred that when $(H \times V \times F)/N > T1$, the driving module 220 simultaneously reduces the quantity of the driven scan lines 140 in the blank region 120 and the quantity of the driven data lines 130 in the blank region 120.

For the convenience of explanation, the embodiment of this application provides a specific example. In this example, the resolution of the display panel 100 is 1920*1080 (at this time, the number of scan lines 140 in the effective region 110 is 1920, and the number of data lines 130 in the effective region 110 is 1080), the input LVDS clock frequency that the timing control chip can accept is 100 MHz, and the clock frequency of the Mini-LVDS output by the timing control chip 240 and clock frequency acceptable by the data driver chip 260 are 400 MHz, the display color depth is 8 bit, and the number of display signal channels is 2.

Since the calculation formula of the LVDS clock frequency is $T1=(H \times V \times F)/N$, when the image refresh rate is 60 HZ, the number of scan lines 140 in the blank region 120 is 280, and the number of data lines 130 in the blank region 120 is 45, LVDS clock frequency=(2200×1125×60)/2 Hz=74.25 MHz, so this LVDS clock frequency meets the requirements that the timing control chip 240 can support and accept. When the image refresh rate is adjusted to 75 HZ, the LVDS clock frequency=(2200×1125×75)/2 Hz=92.816 MHz, and this LVDS clock frequency also meets the requirements that the timing control chip 240 can support and accept. But if you continue to increase the refresh rate to 90 HZ, then the LVDS clock frequency=(2200×1125×90)/2 Hz=111.375 MHz, which is beyond the acceptable range supported by the timing control chip 240, which will cause failure of display of images. Therefore, the display of this example can only display images with a refresh rate of no more than 75 HZ, and cannot perform applications with a refresh rate of 90 Hz, 100 Hz or even higher. In a possible method, if a higher refresh rate is to be applied, the timing control chip and related hardware must be replaced, resulting in an increase in cost.

After adopting the solution in the embodiment of the present application, still taking the display panel 100 in the above example as an example, at this time, the number of the scan lines 140 in the blank region 120 that are being driven can be reduced to 80, and the number of the data lines 130 in the blank region 120 that are being driven can be reduced to 20. At this time, even if the refresh rate is increased to 90 HZ, the LVDS clock frequency=(2000×1100×90)/2 Hz=99 MHz, which does not exceed the input LVDS clock frequency that the timing control chip 240 can support and accept, so as to meet the application with a refresh rate of 90 HZ.

It should be noted that the requirements for the LVDS clock frequency, the number of data lines 130 in the blank region 120 and the number of scan lines 140 in the blank region 120 in the above example are only for convenience of description. It does not mean that the LVDS clock frequency in the embodiments of the present application is 100, the number of data lines 130 in the blank region 120 in the display device 10 may be 45, and the number of scan lines 140 in the blank region 120 in the display device 10 may be 280. Furthermore, it does not mean that in the embodiments of the present application, the number of data lines 130 in the blank region 120 that are being driven may be 80, and the number of scan lines 140 in the blank region 120 that are being driven may be 20. The specific number of data lines 130 in the blank region 120 that are being driven and the number of scan lines 140 in the blank region 120 that are being driven may be selected depending on actual conditions.

When the resolution of the display panel 100 used is 1920*1080, in the embodiments of this application, $1940 \le H' < 3000$, $1090 \le V' < 2465$. Further, the number of data lines 130 in the blank region 120 is greater than 10 but less than 485, and the number of scan lines 140 in the blank region 120 is greater than 20 but less than 1080. Because currently in the display panel 100 with a resolution of 1920*1080, the number of data lines 130 in the blank region 120 may be more than 2465, and the number of scan lines 140 in the blank region 120 may be more than 3000, and when driving, all data lines 130 and scan lines 140 in the effective region 110 and blank region 120 are simultaneously driven, but only the data lines 130 and scan lines 140 in the effective region 110 participate in the display of images. Therefore, in the embodiments of the present application, the number of driving data lines 130 and scan lines 140 in the blank region 120 is reduced at the same time, which is less than the typical number, so that the clock frequency of the input signal can be reduced, and the refresh rate of the display device 10 can be improved. Since the blank region 120 (Blank) is the effective signal switching gap between the previous frame and the next frame, and the signal in the effective region 110 is not affected, a proper reduction will not affect the display effect and can reduce the signal rate.

Because in the display panel 100 with a resolution of 1920*1080, the total time of the row driving signal HS is HTotal, and HTotal consists of a low-level pulse width HSM of HS, a display front-end spare time HBP, a display rear-end spare time HFP, and a row drive effective time HSV, in order to ensure the orderly transmission of data and the normal display of images, HSM, HBP, and HFP must meet a certain period of time, where HSM must meet a minimum of 2clk, and HBP and HFP must meet a minimum of 4clk. HSM, HBP, and HFP collectively form a row-driven blank region 120, and the minimum value may be larger depending on the characteristics of the IC. Since in a general FHD resolution display, the row drive signal is transmitted in two left and right ports, the minimum value of HBlank needs to be guaranteed to be 20clk, and since the HSV is 1920, the minimum value of Htotal needs to be guaranteed to be 1940.

Similarly, the total time of the vertical synchronization signal VS is VTotal, and VTotal is composed of a low-level pulse width VSM of VS, a display front-end spare time VBP, a display rear-end spare time VFP, and a row drive effective time VSV, in order to ensure the orderly transmission of data and the normal display of images, VSM, VBP, and VFP must meet a certain period of time, where HSM must meet a minimum of 2H, and HBP and HFP must meet a minimum of 4H. HSM, HBP, and HFP collectively form a row-driven blank region 120 (VBlank), and the minimum value may be larger depending on the characteristics of the IC. Thus, the minimum value of VBlank needs to be guaranteed to be 10H, and since VSV is 1080, the minimum value of Vtotal needs to be guaranteed to be 1090.

In the GDL driving circuit 200, the minimum value of Vtotal is usually determined in conjunction with the GDL driving timing. In order to improve the driving stability of the clock signal, multiple sets of clock cycles are used for scan driving. The time from the rising edge of the vertical scanning drive start pulse signal STV to the rising edge of the first clock signal is at least 1H, then the time from the rising edge of STV to the rising edge of the nth clk is nH. In addition, in order to prevent the polarization of the liquid crystal, each frame needs to change the polarity once, which is controlled by the POL signal. In order not to affect the display of images, the POL needs to be flipped in the Blank interval, and the time interval between the clock signal and the STV signal is at least 2H, then the minimum VTotal is 1080+n+4 (for example, when n=6, the minimum value of VTotal is 1090).

It should be noted that the specific numbers of the data lines 130 and scan lines 140 in the blank region 120 that are being driven are only based on the display panel 100 with a resolution of 1920*1080. When the resolution of the display panel 100 changes, the numbers of the data lines 130 and the scan lines 140 in the blank region 120 that are being driven will change accordingly.

In addition, the embodiment of the present application further takes into account the clock frequency of the output signal in the driving circuit 200, since the signal output interface of the timing control chip 240 outputs Mini-LVDS, and the clock frequency of the Mini-LVDS=$(H\times V\times F\times 3\times M)/6N$, where M is the color depth. Also taking the above example as a reference, when the refresh rate is 90 HZ and the output Mini-LVDS clock frequency acceptable to the timing control chip 240 is 400 MHz, then Mini-LVDS clock frequency=$(2200\times 1125\times 90\times 3\times 8)/(6\times 2)$ Hz=445.5 MHz, so the display panel 100 cannot display images with a refresh rate of 90 HZ. When the number of the scan lines 140 in the blank region 120 that are being driven is reduced to 80, and the number of the data lines 130 in the blank region 120 that are being driven is reduced to 20, even if the refresh rate is increased to 90 HZ, at this time, the Mini-LVDS clock frequency=$(2000\times 1100\times 90\times 3\times 8)/(6\times 2)$ Hz=396 MHz, which can also meet the acceptable output Mini-LVDS clock frequency of the timing control chip 240, thereby realizing the application with a refresh rate of 90 Hz.

Therefore, as an implementation of the embodiments of the present application, in addition to satisfying $H\times V<T\times N/F$, the $H\times V$ also satisfies $H\times V<T2\times 2N/(F\times M)$; where T2 is the clock frequency of the mini low-voltage differential signal (Mini-LVDS) output by the timing control chip 240. In general, when the refresh rate is increased to exceed the input LVDS clock frequency that the timing control chip 240 can support and accept, without changing the color depth, it will also exceed the output Mini-LVDS clock frequency that the timing control chip 240 can support and accept. Therefore, it is only needed to calculate whether the input LVDS clock frequency is satisfied, and it is not needed to calculate the input LVDS clock frequency and the output Mini-LVDS clock frequency at the same time, thereby reducing the amount of calculation. However, in order to avoid some special cases, where the refresh rate, the total number of scan lines 140 that are being driven and the total number of data lines 130 that are being driven, the selection of the three results in only one of the requirements of the input LVDS clock frequency or the output Mini-LVDS clock frequency in the timing control chip 240 can be met. If only one of them is considered, the corresponding images cannot be displayed. Therefore, the embodiments of the present application may need to satisfy both the requirement for the input LVDS clock frequency and the requirement for the output Mini-LVDS clock frequency of the timing control chip 240.

In this embodiment, when the refresh rate is adjusted, that is, when the set refresh rate F changes, the driving circuit 200 can automatically calculate the total number of scan lines 140 and data lines 130 that meet the display conditions according to the set refresh rate, the related clock frequency requirements in the timing control chip 240, the number of display signal channels, and the color depth, so that the driving module 220 can further adjust the quantity of the driven scan lines 140 in the blank region 120 and the quantity of the driven data lines 130 in the blank region 120, and the user can choose among the adjustment options for the resolution.

In order to further improve the refresh rate of the display device 10, the embodiments of the present application further provide the following implementations:

In one implementation, instead of using the marked LVDS clock frequency as the actual LVDS clock frequency, the actually supported LVDS clock frequency tested is used as the actual LVDS clock frequency in the formula.

It can be understood that: before the timing control chip 240 is installed in the display device 10, in the packaging and testing stage of the timing control chip 240, the batch of chips with strong ability to track and lock the signal is screened out or the LVDS signal receiving module 210 is upgraded so that the receiving clock frequency meets higher requirements. Taking the clock frequency of 100 MHz received by the LVDS of the current mainstream timing control chip 240 as an example, through this embodiment, the timing control chip 240 capable of receiving 115 MHz LVDS clock frequency can be screened out, so that when the refresh rate is increased, even if the LVDS clock frequency reaches 115 MHz, it is still within the receiving range of the timing control chip 240.

Figure 2:
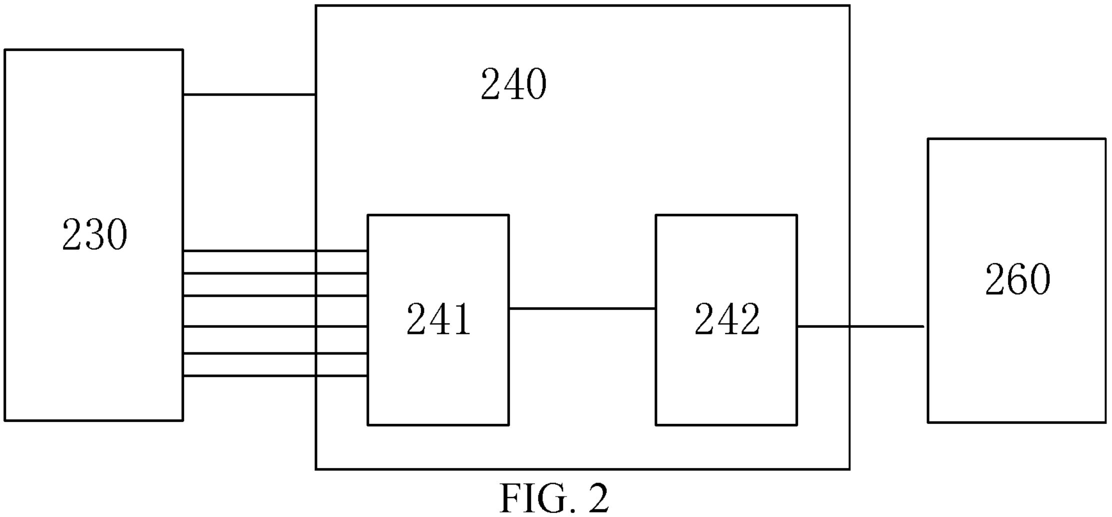
FIG. 2 is a schematic diagram of a driving circuit provided by an implementation in an embodiment of the present application.

In another implementation, as shown in FIG. 2, the timing control chip 240 includes a color depth reduction module 241 and a grayscale enhancement module 242. The color depth reduction module 241 receives the low voltage differential signal, and reduces the color depth displayed by the low voltage differential signal. The grayscale enhancement module 242 is connected to the color depth reduction module 241 to provide a sensed grayscale to compensate for the color depth reduced by the color depth reduction module 241.

As a specific example, the Mini-LVDS signal in this embodiment is displayed with 8 bits before passing through the color depth reduction module 241, and the color depth reduction module 241 changes the Mini-LVDS signal from 8 bits to 6 bits for display, and then the grayscale enhancement module 242 activates the grayscale enhancement technology FRC (Frame Rate Control) to increase the 2 bit sensed grayscale, and uses the 6 bit+2FRC technology to replace the original 8 bit to achieve the same color depth.

In this implementation, since the color depth reduction module 241 weakens the color depth of the original Mini-LVDS signal, the Mini-LVDS clock frequency can be reduced to avoid the refresh rate exceeding the application conditions caused by the Mini-LVDS clock frequency. By combining this implementation, the embodiment of the present application can further improve the applications of the refresh rate. In combination with the solution of this embodiment, the display device in the embodiment of the present application can also support the application with a refresh rate of 100 Hz.

Figure 3:
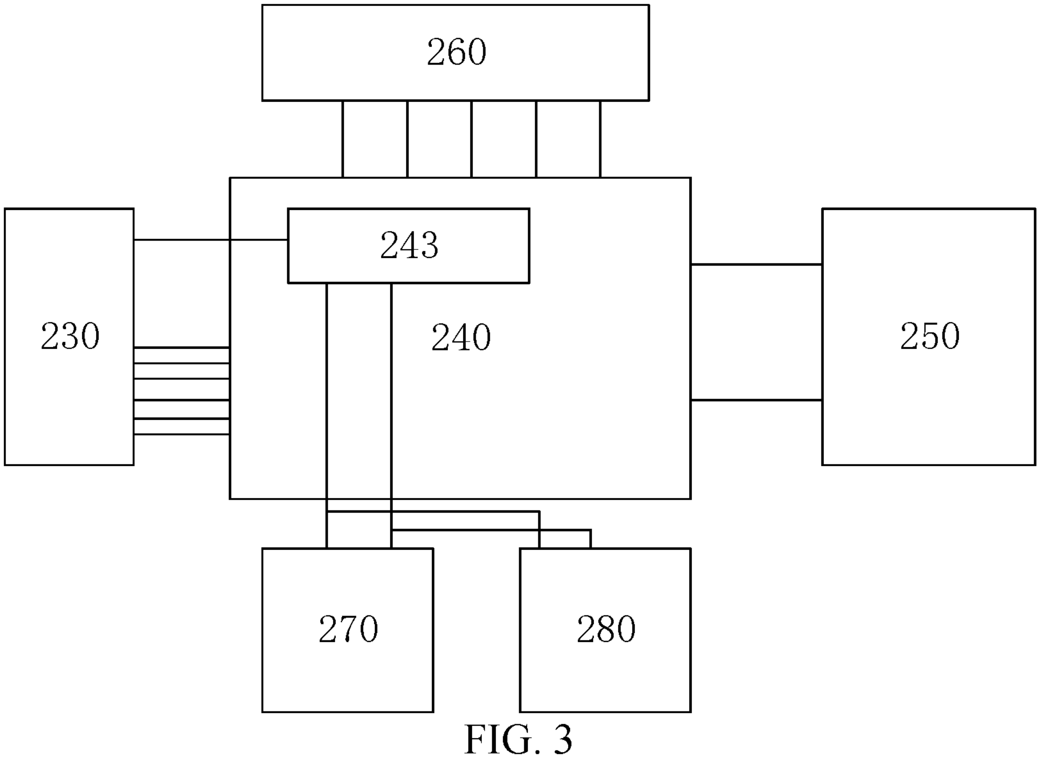
FIG. 3 is a schematic diagram of another driving circuit provided by an implementation in an embodiment of the present application.

Furthermore, as shown in FIG. 3, this embodiment also implements compatible switching between the 8 bit/75 Hz mode and the 6 bit+2FRC/100 Hz mode through the dual register mode. In particular, the timing control chip 240 is connected with a first register 270 and a second register 280. The data corresponding to the 8 bit/75 Hz mode is stored in the first register 270, and the data corresponding to the 6 bit+2FRC/100 Hz mode is stored in the second register 280. The first register 270 and the second register 280 use the same data bus, but have different addresses. The timing control chip 240 reads the corresponding operating mode through different addresses. After the receiving module 210 receives the setting signal, when the setting signal is at a high level, the timing control chip 240 connects to the first register 270 through a selection module 243, and displays in 8 bit/75 Hz mode. When the setting signal is at low level, the timing control chip 240 connects to the second register 280 through the selection module 243, and displays in 6 bit+2FRC/100 Hz mode. Of course, it can also be reversed that when the signal is set at low level, use 6 bit+2FRC/100 Hz mode for display, and when the signal is set at high level, use 8 bit/75 Hz mode for display, depending on the actual situation. In addition, the coding in the gamma module 250 (P-gamma) connected to the timing control chip 240 is adjusted accordingly.

Furthermore, in order to ensure a superior display effect, different display modes also correspond to different Gamma voltages. This part needs to store the P-gamma code in the corresponding register synchronously with the code of the timing control chip 240. When in use, the timing control chip 240 is used to read the corresponding registers, and then the encoded data is imported into the gamma module 250 through the bus connected to the gamma module 250.

Figure 4:
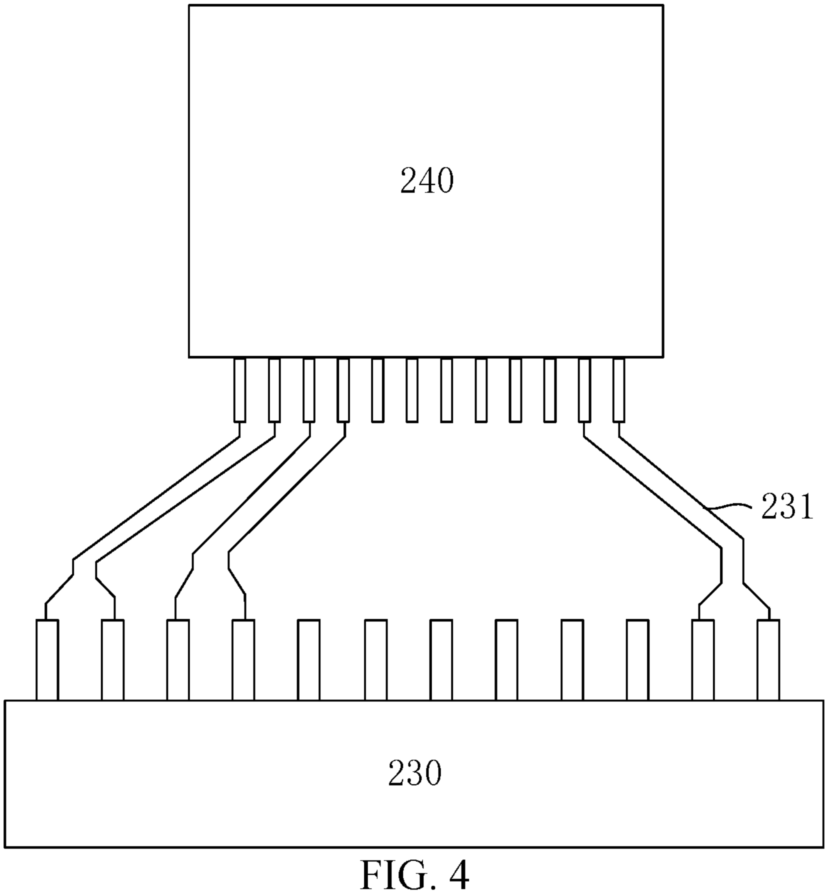
FIG. 4 is a partial schematic diagram of a driving circuit provided by an embodiment of the present application.

In addition, as shown in FIG. 4, in the embodiments of the present application, in order to improve the display effect, the distance between two adjacent input signal traces 231 is designed to be greater than or equal to two times the width of input signal trace 231. It is also possible to further make the thickness of the timing control chip 240 greater than the distance between adjacent input signal traces 231. It is also possible to make the distance between two adjacent differential pairs greater than or equal to twice the distance between adjacent input signal traces 231. Through the above design, the LVDS driver and receiver are placed as close as possible to the connector 230, the length of the input signal trace 231 is minimized, and the signal attenuation, electromagnetic radiation, and signal caused by the increase of the signal rate are reduced.

Furthermore, in order to avoid display out-of-sync problems due to refresh rate switching in the embodiment of the present application, in particular, when the user of the whole machine displays a static image, the refresh rate requirement is low, and the display system needs to switch from a high refresh rate display mode to a low refresh rate display mode. When the refresh rate becomes lower, the charging time of the pixels of the display panel 100 will increase, so that the display brightness will change, and flickering will easily occur.

Based on this, the embodiments of the present application increase the number of scan lines 140 in the blank region 120 that are being driven and/or the number of data lines 130 in the blank region 120 that are being driven through the driving module 220 when the refresh rate is lowered, where the value of H×V×F remains unchanged. Further, the number of driving data lines 130 in the blank region 120 is synchronously increased to maintain a constant clock frequency and realize synchronous display. The corresponding values are set as shown in the following table.

| H | V | F (Hz) | LVDS Clock Frequency (Hz) | H | V | F (Hz) | LVDS Clock Frequency (Hz) |
|---|---|---|---|---|---|---|---|
| 2000 | 1100 | 100 | 110000000 | 2000 | 1507 | 73 | 110000000 |
| 2000 | 1111 | 99 | 110000080 | 2000 | 1528 | 72 | 110000000 |
| 2000 | 1122 | 98 | 110000000 | 2000 | 1549 | 71 | 110000000 |
| 2000 | 1134 | 97 | 110000000 | 2000 | 1571 | 70 | 110000000 |
| 2000 | 1146 | 96 | 110000000 | 2000 | 1594 | 69 | 110000009 |
| 2000 | 1158 | 95 | 110000000 | 2000 | 1618 | 68 | 110000000 |
| 2000 | 1170 | 94 | 110000000 | 2000 | 1642 | 67 | 110000000 |
| 2000 | 1183 | 93 | 110000000 | 2000 | 1667 | 66 | 110000000 |
| 2000 | 1196 | 92 | 110000000 | 2000 | 1692 | 65 | 110000000 |
| 2000 | 1209 | 91 | 110000000 | 2000 | 1719 | 64 | 110000000 |
| 2000 | 1222 | 90 | 110000000 | 2000 | 1746 | 63 | 110000000 |
| 2000 | 1236 | 89 | 110000000 | 2000 | 1774 | 62 | 110000000 |
| 2000 | 1250 | 88 | 110000000 | 2000 | 1803 | 61 | 110000000 |
| 2000 | 1264 | 87 | 110000000 | 2000 | 1833 | 60 | 110000000 |
| 2000 | 1279 | 86 | 110000000 | 2000 | 1864 | 59 | 110000000 |
| 2000 | 1294 | 85 | 110000000 | 2000 | 1897 | 58 | 110000000 |
| 2000 | 1310 | 84 | 110000000 | 2000 | 1930 | 57 | 110000000 |
| 2000 | 1325 | 83 | 110000000 | 2000 | 1964 | 56 | 110000000 |
| 2000 | 1341 | 82 | 110000000 | 2000 | 2000 | 55 | 110000000 |
| 2000 | 1358 | 81 | 110000000 | 2000 | 2037 | 54 | 110000000 |
| 2000 | 1375 | 80 | 110000000 | 2000 | 2075 | 53 | 110000000 |
| 2000 | 1392 | 79 | 110000000 | 2000 | 2115 | 52 | 110000000 |
| 2000 | 1410 | 78 | 110000000 | 2000 | 2157 | 51 | 110000000 |
| 2000 | 1429 | 77 | 110000000 | 2000 | 2200 | 50 | 110000000 |
| 2000 | 1447 | 76 | 110000000 | 2000 | 2245 | 49 | 110000000 |
| 2000 | 1467 | 75 | 110000000 | 2000 | 2292 | 48 | 110000000 |
| 2000 | 1486 | 74 | 110000000 | | | | |

Figure 5:
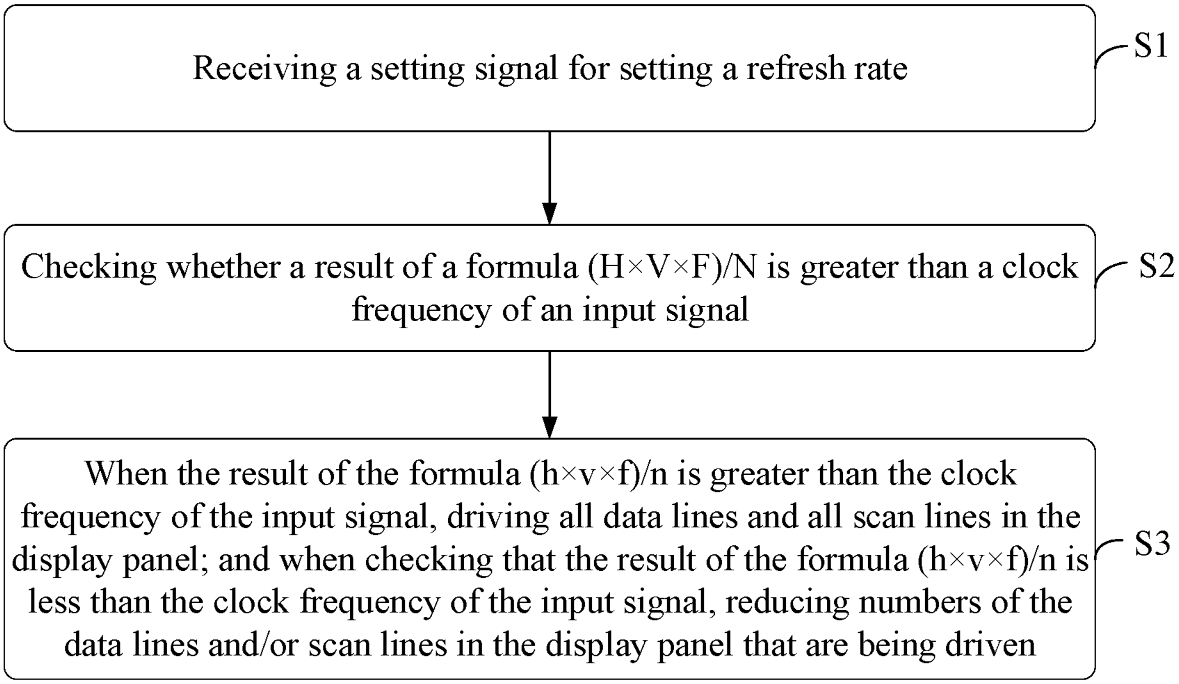
FIG. 5 is a flow chart of a method for driving a display device provided by an embodiment of the present application.

Correspondingly, as shown in FIG. 5, the embodiments of the present application further provide a method for driving a display device, which is used to drive the display device in the above embodiment, including:

S1: receiving a setting signal for setting the refresh rate;

S2: checking whether the result of the formula (H×V×F)/N is greater than the clock frequency of the input signal;

S3: When the result of the formula (H×V×F)/N is greater than the clock frequency of the input signal, driving all data lines and all scan lines in the display panel; when the result of the formula (H×V×F)/N is less than the clock frequency of the input signal, less data lines and/or scan lines in the display panel are driven.

The application further provides another display device. As another embodiment provided by the present application, the display device includes a display panel and a driving circuit for driving the display panel. The driving circuit includes a timing control chip, and the timing control chip receives a low-voltage differential signal and outputs a mini low-voltage differential signal. The driving circuit includes a receiving module and a driving module. The receiving module is used to receive a setting signal for setting a refresh rate of F. The driving module is connected to the receiving module and is used to drive the data lines and scan lines in the display panel. The display panel includes an effective region and a blank region. Both the effective region and the blank region include a plurality of data lines and a plurality of scan lines. F includes 48 HZ, 60 HZ, 75 HZ, 90 HZ or 100 HZ. The number of scan lines in the blank region is 20-1080. The number of data lines in the blank region is 10-1380.

After using the display device in this embodiment, you can directly choose 48 HZ, 60 HZ type low-configuration chip hardware, and then through the selected refresh rate display mode, the driver module can automatically choose a combination from the range of 20-1080 scan lines and 10-1380 data lines in the blank region, so that the display device can display the images with refresh rates of 75 HZ, 90 HZ or 100 HZ, which greatly improves the market competitiveness of the product.

It should be noted that the limitations of various operations involved in this solution will not be deemed to limit the order of the operations, provided that they do not affect the implementation of the specific solution, so that the operations written earlier may be executed earlier or they may also be executed later or even at the same time. The solutions of different embodiments can be combined and applied should no conflict occurs, and as long as the present solution can be implemented, they should all be regarded as falling in the scope of protection of this application.

In addition, the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, and shall all be regarded as falling in the scope of protection of this application.

What is claimed is:

1. A display device, comprising a display panel and a driving circuit configured for driving the display panel, wherein the driving circuit comprises a receiving module and a driving module, wherein the receiving module is configured to receive a setting signal for setting a refresh rate of F, and the driving module is coupled to the receiving module and configured for driving a plurality of data lines and a plurality of scan lines in the display panel;

wherein when (H×V×F)/N>T1, the driving module is configured to drive the display panel with H' as a total number of rows of scan lines and with V as a total number of columns of data lines, wherein H'×V'<H xV, and T1'=(H'×V'×F)/N≤T1; wherein H×V satisfies H×V<T×N/F, and F≥48 hz;

wherein H denotes a total number of all scan lines in the display panel, which is equal to a sum of a number of scan lines in an effective region of the display panel and a number of scan lines in a blank region of the display panel; V denotes a total number of all data lines in the display panel, which is equal to a sum of a number of data lines in the effective region of the display panel and a number of data lines in the blank region of the display panel; T1 denotes a clock frequency of an input signal in the driving circuit, and N denotes a number of display signal channels; and T1' denotes a clock frequency of the input signal in the driving circuit when part of all the scan lines in the number of H' and part of all the data lines in the number V' are used to drive the display panel.

2. The display device as recited in claim 1, wherein when (H×V×F)/N>T1, the driving module is configured to simultaneously reduce a number of scan lines in the blank region that are being driven and a number of data lines in the blank region that are being driven.

3. The display device as recited in claim 2, wherein when the set refresh rate F is changed, the driving module is configured to automatically adjust the number of scan lines in the blank region that are being driven and the number of data lines in the blank region that are being driven.

4. The display device as recited in claim 1, wherein when the set refresh rate F becomes less, the driving module is configured to increase the number of scan lines in the blank region that are being driven; and wherein the value of H×V×F remains unchanged.

5. The display device as recited in claim 1, wherein when the set refresh rate F becomes less, the driving module is configured to increase the number of data lines in the blank region that are being driven; and wherein the value of H×V×F remains unchanged.

6. The display device as recited in claim 1, wherein when the set refresh rate F becomes less, the driving module is configured to simultaneously increase the number of scan lines in the blank region that are being driven and the number of data lines in the blank region that are being driven;

wherein the value of H×V×F remains unchanged.

7. The display device as recited in claim 1, wherein 1940≤H'<3000, 1090≤V'<2465.

8. The display device as recited in claim 7, wherein the number of scan lines in the effective region is 1920, the number of data lines in the effective region is 1080; the number of data lines in the blank region is greater than 10 and less than 485, and the number of scan lines in the blank region is greater than 20 but less than 1080.

9. The display device as recited in claim 1, wherein the driving circuit comprises a connector and a timing control chip, wherein the connector is connected to the timing control chip through a plurality of input signal traces and is configured to provide a low-voltage differential signal for the timing control chip, wherein T1 is the clock frequency of the low-voltage differential signal;

wherein a distance between every two adjacent input signal traces is greater than or equal to twice a width of each of the plurality of input signal traces.

10. The display device as recited in claim 9, wherein a thickness of the timing control chip is greater than the distance between every two adjacent input signal traces.

11. The display device as recited in claim 9, wherein the timing control chip comprises a color depth reduction module and a grayscale enhancement module; wherein the color depth reduction module is configured to receive the low-voltage differential signal and reduce a color depth of the low-voltage differential signal, and wherein the grayscale enhancement module is connected to the color depth reduction module to provide a sensed grayscale to compensate for the color depth reduced by the color depth reduction module.

12. The display device as recited in claim 11, wherein the color depth reduction module is operative to change the color depth of the low-voltage differential signal from 8 bits to 6 bits, and wherein the grayscale enhancement module is configured to activate a grayscale enhancement technology to increase 2 bits sensed grayscale.

13. The display device as recited in claim 12, wherein the timing control chip is connected to a first register and a second register, wherein the first register is configured to store data corresponding to a 8 bit/75 Hz mode, and wherein the second register is configured store data corresponding to a 6 bit+2FRC/100 Hz mode;

wherein after the receiving module receives the setting signal, when the setting signal is a high level, the timing control chip is connected to the first register through a selection module and is operative to perform display in the 8 bit/75 Hz mode; and wherein when the setting signal is a low level, the timing control chip is connected to the second register through the selection module, and is operative to perform display in the 6 bit+2FRC/100 Hz mode.

14. The display device as recited in claim 13, wherein different display modes correspond to different gamma voltages.

15. The display device as recited in claim 9, wherein H×V satisfies H×V<T2×2N/(F×M) in addition to H×V<T×N/F;

wherein T2 denotes a clock frequency of a mini low-voltage differential signal output by the timing control chip, and M denotes a color depth after processing the mini low-voltage differential signal by the timing control chip.

16. The display device as recited in claim 9, wherein the receiving module is disposed in the connector, and the driving module is disposed in the timing control chip.

17. A driving method of a display device, comprising:

receiving a setting signal for setting a refresh rate;

checking whether a result of a formula (H×V×F)/N is greater than a clock frequency of an input signal; and in response to checking that the result of the formula (H×V×F)/N is greater than the clock frequency of the input signal, driving all data lines and all scan lines in the display panel; and in response to checking that the result of the formula (H×V×F)/N is less than the clock frequency of the input signal, reducing numbers of the data lines and/or scan lines in the display panel that are being driven;

wherein H denotes a total number of all scan lines in the display panel, which is equal to a sum of a number of scan lines in the effective region and a number of scan lines in the blank region; V denotes a total number of all data lines in the display panel, which is equal to a sum of a number of data lines in the effective region and a number of data lines in the blank region in the display panel; F denotes a set refresh rate, and N denotes a number of display signal channels.

* * * * *